May 1, 1956     O. LE ROY ROSEBROOK     2,743,584

HYDRAULIC CONTROL SYSTEM FOR DUPLICATING TOOLS

Filed May 4, 1953     2 Sheets-Sheet 1

INVENTOR.
OREL LEROY ROSEBROOK
BY
D. Gordon Angus
ATTORNEY.

May 1, 1956   O. LE ROY ROSEBROOK   2,743,584
HYDRAULIC CONTROL SYSTEM FOR DUPLICATING TOOLS
Filed May 4, 1953   2 Sheets-Sheet 2

INVENTOR.
OREL LEROY ROSEBROOK
BY
J. Gordon Angus
ATTORNEY.

United States Patent Office 2,743,584
Patented May 1, 1956

2,743,584

HYDRAULIC CONTROL SYSTEM FOR DUPLICATING TOOLS

Orel Le Roy Rosebrook, Monterey Park, Calif., assignor to True-Trace Corporation, El Monte, Calif., a corporation of California Application May 4, 1953, Serial No. 352,896

7 Claims. (Cl. 60—97)

This invention relates to hydraulic control systems of the type used for remote control of cutting operations on material.

It is known to control the movement of a cutting tool in response to the relative movement of a stylus and template in order to duplicate the configuration of the template on a workpiece; and hydraulic control systems have been used for controlling the movement of the cutting tool by the relative movement of the stylus and template. Furthermore, mechanical linkages between the stylus and the cutting tool have been used, but it has been found that the torque and complicated mechanical motions have been deleterious to the accuracy of the control.

In accordance with the present invention there is provided a hydraulic control system which permits control of a cutting tool from a stylus which may, if desired, be located in a place remote from the cutting tool; and the novel system does not require any mechanical linkage element. My novel hydraulic control system results in a definite accurate control of the cutting tool in response to the stylus movement, permitting accurate duplication on the work-piece.

The invention is carried out by a system of hydraulically operated piston and cylinder arrangements, there being a piston and cylinder for operating the cutting tool, another for operating the stylus means, and a third for operating in conjunction with a remote control valve means.

A feature of the invention resides in the use of separate hydraulic pumps or pressurizing means for each cylinder.

Another feature resides in the remote control valve means involving a double valve arrangement.

The foregoing and other features will be better understood from the following detailed description and the accompanying drawings of which:

Figure 1:
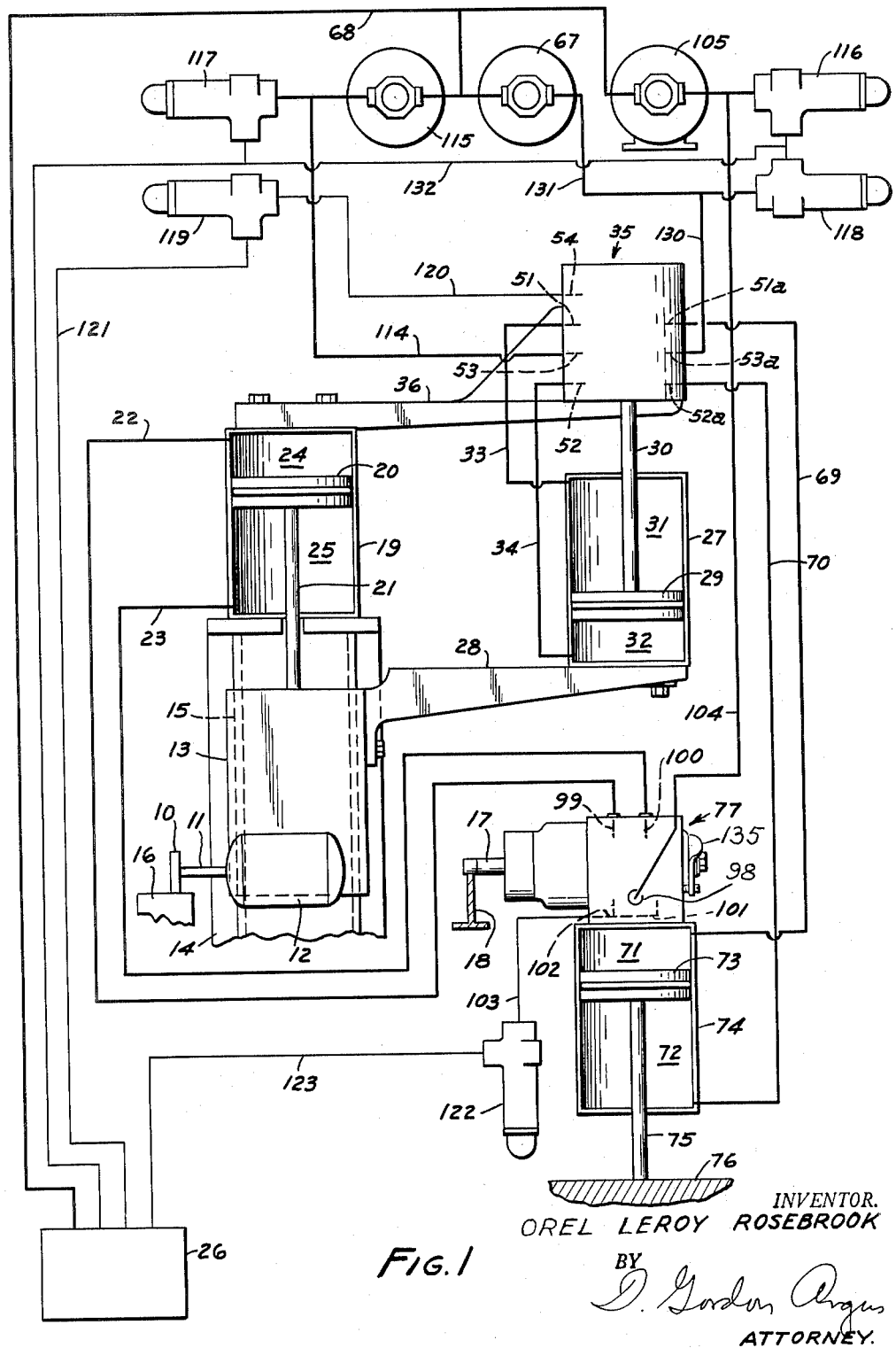
Fig. 1 show a hydraulic control system in accordance with this invention.

Referring to Fig. 1, there is shown a cutting tool 10 fastened on a shaft 11 of a motor 12 which is mounted on a movable platform or slide 13, arranged for up and down motion relative to a stationary member 14, by suitable guide means 15. A work-piece 16 is placed in relation to the cutting tool which may, for example, be a milling cutter. Movement of slide 13 in its up-down path of movement produces corresponding movement of cutting tool 10 relative to the work-piece. For the purpose of thus moving the cutter in a desired manner there is provided a tracing means comprising a stylus 17 placed in relation to a template 18, the configuration of the template surface in contact with the stylus being the configuration which is to be formed on the work-piece by cutter 10.

Provision is made for moving template 18 relative to stylus 17 and also for moving work-piece 16 relative to cutter 10; and since such movements are well known in the art, and can be performed in accordance with well known practice, no further detailed discussion of them is required here. Ordinarily the work-piece and template are fixed to a table which is moved horizontally beneath the cutter and stylus holder, which have no horizontal movement.

In accordance with the system of the present invention, the position of the cutting tool 10 relative to the work-piece 16 is controlled by a hydraulically operated device comprising a stationary cylinder 19 containing a piston 20 having a stem 21, the lower end of which is attached to the movable slide 13 so that the cutter moves up and down with the piston. Hydraulic conduits 22 and 23 lead to the respective cylinder chambers 24 and 25 above and below the piston; and these conduits can supply a hydraulic fluid such as oil under pressure in either direction from a reservoir 26 through mechanism which is explained in detail below. While these conduits are shown in single line diagrammatic form, it will be understood that these and all other conduits in the figure will have the usual internal passageways for flow of the fluid and furthermore that they may be of the flexible type if desired. When the fluid pressure is supplied through conduit 22, the piston 20 will be forced downwardly, expelling the fluid in chamber 25 through conduit 23 which at this time will not be under pressure. Similarly, when fluid pressure is applied through conduit 23, the piston will be forced upwardly, expelling fluid from chamber 24 through conduit 22 which now will not be under pressure.

A second cylinder 27 is held in fixed relation to the movable slide 13 by a rigid bracket means 28, the cylinder 27 having a piston 29 attached to a stem 30 and providing in the cylinder an upper chamber 31 above the piston and a lower chamber 32 below the piston. Fluid conduits 33 and 34 lead to the respective upper and lower chambers, the opposite ends of these conduits leading to a remote control valve 35 which is held in a stationary position. It can conveniently be rigidly attached to stationary cylinder 19 by a bracket 36, as shown.

Figure 2:
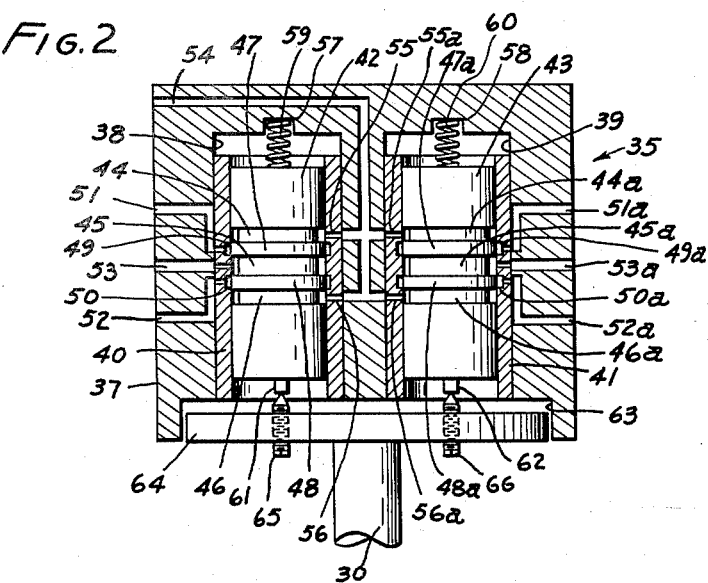
Fig. 2 shows in cross section a remote control valve used in the system of Fig. 1.

The remote control valve 35, shown in cross section in Fig. 2, comprises a housing 37 containing a pair of bores 38 and 39 having parallel axes which extend in the vertical direction on the drawings; and within the bores there are set respective sleeves 40 and 41. Within the respective cylindrical sleeves 40 and 41 there are located respective valve spools 42 and 43 adapted to slide axially in either direction within their sleeves. Spool 42 has three circumferential grooves 44, 45 and 46, the adjacent grooves being separated by collar portions 47 and 48.

The sleeve 40 is provided with ports 49 and 50 in the shape of annular grooves which coincide with shoulders 47 and 48 when the spool is in its normal position shown in Fig. 2; the port 49 communicating with passageway 51 through the housing and the port 50 communicating with passageway 52 through the housing. A passageway 53 goes through the housing, passing through the sleeve 40 at a position midway between the exit of passageways 51 and 52 into the interior of sleeve 40, and communicating with groove 45 when the spool is in its normal position.

The spool 43 and the sleeve 41 are provided with elements 44a, 45a, 46a, 47a, 48a, 49a, 50a, 51a, 52a, and 53a which correspond respectively with elements 44, 45, 46, 47, 48, 49, 50, 51, 52 and 53 of spool 42 and sleeve 40.

A conduit 54 leads from the exterior of the housing to passageways 55 and 56 leading to the interior of spool 40 at positions corresponding with grooves 44 and 46, and with corresponding passageways 55a and 56a leading into the interior of spool 43 at positions corresponding with grooves 44a and 46a, when the spools are in their normal positions.

A recess 57 is provided in the housing at the upper end of bore 38 and a similar recess 58 is provided in the housing at the upper end of bore 39. Compression springs 59 and 60 are placed within these respective recesses and bear against the upper ends of spools 42 and 43. At the opposite end of spool 42 from the spring 59 there is axially located a knob or pin 61; and a similar knob or pin 62 is provided at the same end of the other spool 43. The housing is provided with a cylindrical indent or bore at the same end as pins 61 and 62 are located; and a plate 64 is adapted to fit within this bore. Plate 64 carries two adjustable set screws 65 and 66, the ends of which are adapted to contact with respect pins 61 and 62. The arrangement is such that compression springs 59 and 60 tend to push the respective spools 42 and 43 down against the set screws 65 and 66; and the particular location of the spools within the sleeves is determined by the position of the plate 64 which is fixed on the end of the shaft 30.

The passageway 53 has coupled to it a fluid conduit 114 which leads to the pressure side of a fluid pump 115 which pumps the fluid from the reservoir 26 through conduit 68. The passageway 53a of valve 35 is connected with fluid conduit 130 which communicates with conduit 131 at the high pressure output of a pump 67, which also receives the hydraulic fluid from supply conduit 68 leading from reservoir 26. The passageways 51a and 52a communicate with respective fluid conduits 69 and 70 which communicate with chambers 71 and 72 respectively, located above and below a piston 73 in a cylinder 74. The piston stem 75 is fastened to the piston 73 and also to a stationary mounting or support 76 so that the piston 73 is maintained stationary relative to the various stationary parts such as 76, 19 and 35; and flow of oil to or from chambers 71 and 72 accordingly changes the elevation of cylinder 74 on which there is mounted the housing of the stylus mechanism, 77.

The stylus mechanism 77 comprises a housing 78 (Fig. 3) containing a chamber 79 and having a neck portion 80 at one end with a channel 81 leading out of the housing from chamber 79. There is axially within the housing and channel 81 the tracer member 17 in the form of a pendulum type stem or spindle supported for universal movement by a self-aligning bearing 82 on the stem of the tracer. This self-aligning bearing is of a well-known type commonly having an outer collar 82a which is shown fitted within the bore of the housing and resting against an annular protrusion 83 of a bushing 84 threaded within the neck 80 of the housing. In accordance with conventional construction, an inner surface of this collar is spherical at 82b; while the stem carries a ball-race with balls 82c which can roll with universal movement in the sphere. Obviously other forms of self-aligning bearings could be used instead, if desired. At the extreme left end of the stem there is provided a pattern engaging portion 85 which may be secured within the stem 17 by a suitable set screw 86.

Figure 3:
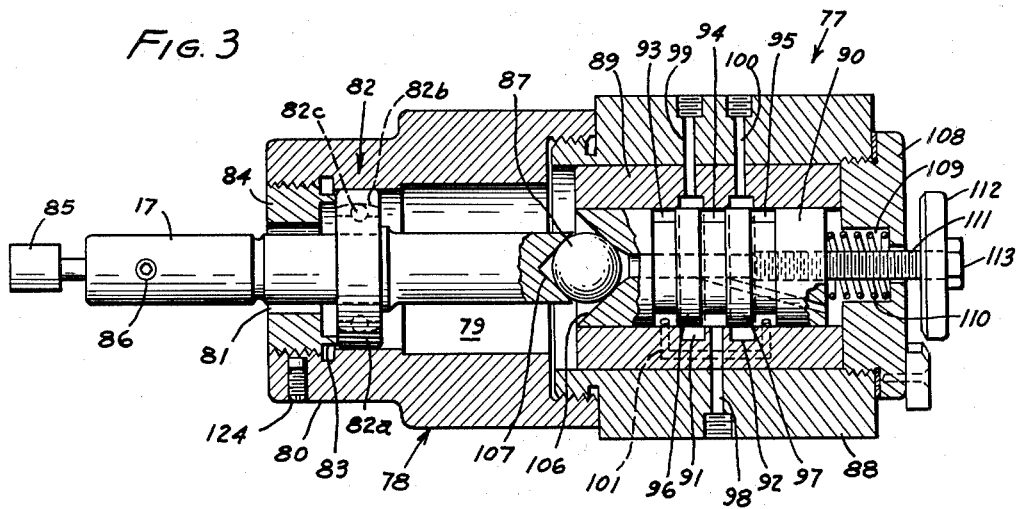
Fig. 3 shows in cross section a stylus-operated valve means used in the system of Fig. 1.

Above the universal bearing 82 there is supported in a cone 107 formed within the end of the spindle, a ball 87 and it will be convenient, although not necessary, for the distance from the center of member 82 to the center of ball 87 to be of the same order of magnitude as the distance from the center of member 82 to the end of the stylus at 85; although in Fig. 3 the distance between members 82 and 87 is shown as somewhat smaller than the distance between members 82 and 85. When approximately equal lengths are used as suggested, there is the advantage that a given amount of movement imparted at the end 85 in any direction will result in approximately the same amount of movement of ball 87 in exactly the opposite direction.

The part of the housing beyond the ball 87 comprises a cylindrical member 88 threaded to and coaxial with the rest of the housing as shown in Fig. 3. Within member 88 there is fitted coaxially therewith a sleeve 89 which contains a spool 90 slidable axially within the sleeve. The sleeve and spool are provided with port arrangements to control the flow of the hydraulic fluid to be used in controlling the cutter. The sleeve is provided with a pair of internal annular ports 91 and 92; and the spool 90 is provided with three external annular ports 93, 94 and 95, leaving the two collars 96 and 97 between the adjacent ones of the ports 93, 94 and 95. The width of the collars 96 and 97 in the direction of the spool axis is at least as great or the same as the width of the ports 91 and 92 so that when the spool is within its central position within the sleeve, the collars 96 and 97 will cover the respective ports 91 and 92.

A passageway 98 connects the central port 94 of the spool with the exterior of the housing as shown; and similar passageways 99 and 100 connect the ports 91 and 92 with the exterior of the housing. The ports 93 and 95 of the spool are connected together by a passageway 101, which passageway is brought out to the exterior of the housing by a connecting passageway 102 (Fig. 1) where it connects with a fluid conduit 103. The passageways 99 and 100 are coupled with fluid conduits 22 and 23, respectively. Passageway 98 is coupled with a fluid conduit 104 from the high pressure side of a pump 105 which pumps the hydraulic fluid from the reservoir through conduit 68.

The end of the spool 90 adjacent the ball 87 is formed with an internal cone 106; and since the end of the spindle 17 adjacent the ball 87 is likewise formed with the internal cone 107, the ball is held between these two cones.

The housing of the stylus device 77 is closed at the end opposite the stylus 17 by the closure cap 108 threaded into the end of member 88; and this cap is internally recessed at 109 to receive a compression spring 110, the other end of which bears against the end of the spool 90 to urge the spool toward the ball 87. To allow for rapid traverse of the stylus member, when desired, there is provided a stem 111 threaded axially into the end of the spool 90; and a handle or knob 112 is placed on the end of the stem outside the housing and locked into position by a lock nut 113. By this arrangement the spool may be pulled away from the ball by the knob 112, and if desired, held out by turning lever 135 on its pivot to a position beneath the nut.

In accordance with good practice and effective and safe operation, there are provided suitable pressure relief valves to prevent pressure from building up in parts of the system. For example, one such valve 116 is connected at the high pressure side of pump 105; and a similar valve 117 is connected at the high pressure side of pump 115, while a third such valve 118 is connected at the high pressure side of pump 67. These valves can be of any well-known type which permits flow of the fluid from the high pressure side through the valve into the low pressure conduit leading back to the reservoir, when the pressure at the high pressure side of the valve exceeds the pressure at which the valve is set to release. Likewise, suitable back pressure valves 119 and 122 are placed at proper positions to prevent undesirable surges of fluid or chatter of moving parts; and this is done by holding suitable back pressure on exhaust ports. These back pressure valves can conveniently be of the type made to be adjustable for the pressures between 0 and about 20 pounds, a convenient back pressure for actual use in this system being about 8 to 10 pounds per square inch. Thus, the adjustment of valve 119 will determine the pressure at which the fluid will be released from conduit 120 into relief conduit 121, which will establish the back pressure on the valves of elements 27, 35 and 74. Similarly, the adjustment of valve 122 will establish the back pressure on the spool valve of element 77, which will be the pressure at which the fluid is released from conduit 103 into relief conduit 123.

The hydraulic control system operates as follows: The pressure and back pressure valves will be adjusted to create desired amounts of pressure and back pressure in the several parts of the system to create an effective and smooth operation. The valves are preferably of the pressure adjustable type which are well known, so that considerable adjustment of pressure is possible. For good operation, it will usually be preferable to provide a relatively high pressure at conduits 22 or 23 for operating the piston 20 which controls the movement of the cutting tool. This pressure will be controlled by the pressure relief valve 116 which can conveniently be adjusted to make the line pressure in conduit 104 somewhere between 200 and 500 pounds per square inch. The particular line pressure will, of course, be that at which the relief valve is adjusted to admit the high pressure fluid into relief conduit 132. The pressure admitted into conduits 69 or 70 for control of cylinder 74 operating the stylus valve position is preferably lower than that admitted into cylinder 19; a good pressure for cylinder 74 being between 100 and 300 pounds per square inch. This latter pressure is, of course, established by adjustment of relief valve 118 which determines the pressure at which fluid is released into relief conduit 132. The pressure permissible into conduits 33 and 34 for operating piston 29 can also conveniently be in the range of about 100 to 300 pounds per square inch; although the actual pressure supplied to conduits 33 and 34 is preferably somewhat less than that provided for conduits 69 and 70. The actual pressure provided for cylinder 27 will be determined by the adjustment of relief valve 117 and the precise pressure will be that at which this valve releases fluid into relief conduit 132.

It will be recognized that the relative speeds of movement of the several pistons and cylinders will depend not only on the fluid pressures supplied to each, but also on the relative proportions of the several cylinders and their pistons. I have found that the types of relative motions which appear most conducive to effective and accurate operation are to provide for the piston 20 being the slowest moving piston in the system so that the slide 13 carrying the cutter will move slower than the stylus device 77 during operation. Such relatively slow motion of piston 20 can be provided in spite of the relatively high pressure supplied to cylinder 19 by making the area of piston 20 substantially larger than the area of piston 73. I have also found that it is desirable for the piston 29 operating the remote control valve 35, to be relatively quick acting; and this can be accomplished in spite of the relatively low pressure supplied to cylinder 27, by making the area of piston 29 sufficiently small. The speed of motion of the cylinder of piston 73 would then be intermediate between the speeds of pistons 20 and 29.

The adjustment bushing 84 of the stylus device will be turned to slide bearing 82 longitudinally until a slight turn in either direction makes the spool 90 move in one direction or the other in accordance with the cooperating action of the bushing 84 and of the compression spring 110. The bushing 84 can then be unscrewed slightly to such a point that pressure by hand on the tracer tip 85, in a direction transverse to the longitudinal axis of the stylus makes the spool 90 move at approximately the same rate of speed and distance for a given pressure in either direction. With this adjustment, the bushing 84 can be locked into position by the set screw 124.

Ordinarily, the tracer tip will be related to the template so that there will be some pressure on the tracer tip with resulting deflection of the tracer tip from its axially aligned position, that is, upward with reference to Figs. 1 and 3. This will cause the spool 90 to be located somewhat to the right of its left-most position (with reference to Fig. 3); because any deflection of the stylus away from its axial position will cause the conical surface 107 to act on ball 87 to move the spool to the right. At such normal position of deflection of the stylus, the collars 96 and 97 will cover the ports 91 and 92 so that the high pressure hydraulic fluid present at port 94 cannot flow to either conduit 22 or 23; and under this condition there will be no transfer of the fluid in chambers 24 and 25, either to or away from these chambers; so that the piston 20 will remain stationary.

Assume now that the change of template surface permits the stylus 17 to move downward toward position of axial alignment with the axis of the spool. The spool will now move somewhat to the left under action of the spring 110 so that communication is permitted between ports 94 and 91, causing the high pressure to be transmitted to conduit 22 which will send the fluid into chamber 24 to depress piston 20 and correspondingly force fluid from chamber 25 out through conduit 23 and into port 92 which is now in communication with exhaust port 95 from whence the fluid flows out exhaust conduit 103, through the back pressure relief valve 122, and through exhaust conduit 123 to the reservoir 26. The action causes the slide 13 to move down, which moves the cutter 10 down against the work-piece 16 by an amount corresponding to the amount by which the template 18 has allowed stylus 17 to move down. As is well known, this will produce a cut on the work-piece in correspondence with the configuration of template surface.

As slide 13 moves downward, the connection 28 will cause cylinder 27 also to move downward; and since the hydraulic fluid fills chambers 31 and 32, the piston 29 will tend to hold its position within the cylinder 27 so that piston stem 30 similarly moves downward carrying with it the adjustment plate 64 of the remote control valve (Fig. 2). This allows the springs 59 and 60 to push the spools 42 and 43 downward out of their neutral positions, shown in Fig. 2, maintaining the knobs 61 and 62 in contact with the upper points of set screws 65 and 66. In their neutral positions (shown in Fig. 2) the pressure ports 49 and 49a do not communicate with any other ports because of being covered by the respective shoulders on the spools; but when the spools are allowed to move downward as just described, pressure port 49 communicates with port 50 and pressure port 49a communicates with port 50a. This causes the fluid under pressure from pump 115 to be applied to chamber 32 of cylinder 27, sending more fluid into this chamber and tending to force piston 29 upward in the cylinder. This will force fluid out of chamber 31 through conduit 33 to port 49 which now is in communication with exhaust port 44, allowing this fluid to exhaust through passageway 54, conduit 120, back pressure valve 119, and exhaust conduit 121, to the reservoir 26.

The same action of the spools causes pressure from pump 67 to be applied through port 45a to port 50a which is now in communication with port 45a, sending the fluid pressure through conduit 70 to chamber 72 of cylinder 74. Since piston 73 is held stationary on mounting 76 the cylinder 74 moves downward expelling fluid from upper chamber 71 through exhaust conduit 69 to port 49a which is now in communication with exhaust port 44a, expelling this fluid through exhaust passageway 54 to the reservoir. This action causes the tracer device 77 to move down to maintain the stylus in contact with the template. Whenever the stylus touches the template by this action, the slight deflection of the stylus out of the axially aligned position with the spool axis, moves the spool to the right to its neutral position so that there is no communication from pressure port 94 to either of ports 91 or 92. Accordingly all oil flow out of the tracer valve is stopped, with corresponding stoppage of any movement of the cutter in the up-and-down direction. Accordingly, whenever the stylus of the tracer valve is in normal contact with the template there is no movement one way or another of the slide 13 and the cutter tool which it carries.

The normal deflection resulting from such normal contact at which no movement of the cutter tool occurs, will ordinarily be arranged to be very slight; for example, of the order of .001 inch deflection of tip 85. For greater deflection than this there will be the fluid flow with consequent motion of the cutter in one direction; and for lesser deflection than this there will be fluid flow with consequent motion of the cutter in the opposite direction.

When the slide stops moving by this action the piston 29 of cylinder 27 continues to move upwardly in that cylinder only far enough to close the pressure ports 45 and 45a from any communication with ports 49 and 50 and ports 49a and 50a respectively, thereby stopping any fluid flow out of the remote control valve 35 to cylinder 27 or to cylinder 74.

The above described action will continue as long as the template angle runs down, that is the template surface recedes away from the stylus as the stylus moves along the template.

When the configuration of the template surface relative to the stylus changes, that is, runs on an upward angle relative to the stylus, the action will be the reverse of that described above. In this case, the stylus will be pushed upward beyond normal, and the spool 90 of the tracer valve will be pushed to the right beyond its neutral position, opening the pressure port 94 to the port 92 and opening the exhaust port 93 to port 91. This will send the fluid pressure into chamber 25 instead of chamber 24, causing the slide 13 to move upwardly instead of downwardly. This will move cylinder 27 upwardly, pushing spools 42 and 43 upwardly, causing the fluid pressure from pump 115 to flow through conduit 33 and into chamber 31 and allowing fluid to flow out of chamber 32 and back through the remote control valve to the reservoir. Similarly, the pressure from pump 67 will send fluid through conduit 69 to the upper chamber 71 of cylinder 74, causing cylinder 74 to move upwardly until the stylus 17 tends to move away from the template surface. Just as soon as the template pressure against the stylus abates, the spool 90 is pushed back to its neutral position by the spring 110 to stop the flow of fluid out of the tracer valve 77 in either direction.

The foregoing control action is an extremely sensitive one as very slight changes of the template angle relative to the stylus produce an immediate and accurate effect on the position of the cutter tool against the work-piece; and there is no lag in the duplicating action of the cutter. This results in extremely accurate duplicating work.

The effective control action is due in large measure to the presence of the double spool arrangement involving spools 42 and 43 in the remote control valve, the two spools being maintained in absolute coordination by the action of the adjustment plate 64. By virtue of this arrangement, the pressure is applied to the upper or lower chambers of cylinder 27 from pressure pump 115 while at the same instant the pressure is correspondingly applied to the corresponding chamber 71 or 72 of cylinder 74 from pressure pump 67. In the same manner, the release from the pressure occurs in both cylinders 27 and 74 at the same instant.

A particular feature producing the exact and definite control resides in the use of the individual pressure sources or pumps 67, 105 and 115 for the individual valve spools of the individual control valve and for the cylinder 74.

It will be understood that variations may suggest themselves to those skilled in the art to within the scope of the invention. For example, while the spool type of valve element has been shown for use in valves 35 and 77, other forms of valves such as a rotary type valve could be used instead.

Again, it would be possible to separate out the two-valve unit in the remote control valve into separate housings, if desired, without departing from the invention, so long as the requirement that both valves be exactly coordinated by a coordinating means is maintained.

It will be recognized further that the relationships of the pistons and cylinders of the three cylinder-piston combinations may be reversed if desired. For example, the piston element 20 could be held in fixed position relative to the fixed surface 76 while cylinder element 19 is connected to the slide 13. Again the cylinder 27 might be connected to adjustment plate 64 with piston 29 connected to support 28. Similarly, cylinder 74 might be connected to the fixed reference surface 76 while piston 73 is connected to support the stylus-operated valve 77. Whatever arrangements are used, it will be seen that the cylinder-piston arrangements 19, 20 and 74, 73 have one element fixed in position while the other is movable. The cylinder-piston combination 27, 29, however, has neither of its elements in fixed position, as they are movable relative to each other and also to the fixed reference surface 76.

I claim:

1. A hydraulic control system for controlling the movement of a cutting tool in response to movement of a stylus-operated valve of the type having a hydraulic pressure port and an exhaust port, said system comprising three cylinders each containing a piston with relative movement between piston and cylinder and providing a pair of chambers in each cylinder one on each side of the piston, a movable member adapted to have the cutting tool mounted thereon, said movable member being supported by the piston of a first of the cylinders, a second of the cylinders being fixed relative to said movable member, a control valve means operated by the piston of said second cylinder, said control valve means comprising a pair of valves each having a pressure port and an exhaust port, and means for moving said pair of valves in unison, said last-named means being attached to the last-named piston, the third of the cylinders being movable and carrying the stylus-operated valve and having its piston fixed relative to the first cylinder, a pair of fluid conduits each separately communicable with the pressure port of the stylus-operated valve in dependence on the valve position and leading to the respective chambers of the first cylinder, a pair of fluid conduits each separately communicable with the pressure port of a first of said pair of valves in dependence on the valve position and leading to the respective chambers of the second cylinder, a pair of fluid conduits each separately communicable with the pressure port of the second of said pair of valves in dependence on the valve position and leading to the respective chambers of the third cylinder, a first fluid pressurizing means with a conduit leading therefrom to the pressure port of the first of said pair of valves, a second fluid pressurizing means with a conduit leading therefrom to the pressure port of the second of said pair of valves and a third fluid pressurizing means with a conduit leading therefrom to the pressure port of the stylus-operated valve.

2. A system according to claim 1 in which pressure relief valves are located at the high pressure side of the respective fluid pressurizing means.

3. A system according to claim 2 in which a back pressure valve is connected to the exhaust port of each of said valves.

4. A hydraulic control system for controlling the movement of a cutting tool in response to the movement of a stylus-operated valve of the type having a hydraulic pressure port and an exhaust port, said system comprising three cylinder-piston combinations each having a cylinder containing a piston with relative movement between piston and cylinder and providing a pair of chambers in each cylinder, one on each side of the piston, at least one or the other of the piston or cylinder of each piston-cylinder combination being a movable element, a movable member adapted to have the cutting tool mounted thereon, said movable member being supported by a first element, which is the movable element, of a first of the piston-cylinder combinations, a second of the piston-cylinder combinations having one of its elements fixed relative to said movable member, a control valve means operated by the other element of said second cylinder-piston combination, said control valve means comprising a pair of valves each having a pressure port and an exhaust port, and means for moving said pair of valves in unison, said last-named means being attached to the last-named element, the third of the piston-cylinder combinations having its movable element fixed relative to the stylus-operated valve and having its other element fixed relative to the second element of the first piston-cylinder combination, a pair of fluid conduits each separately communicable with the pressure port of the stylus-operated valve in dependence on the valve position and leading to the respective chambers of the first cylinder, a pair of fluid conduits each separately communicable with the pressure port of a first of said pair of valves in dependence on the valve position and leading to the respective chambers of the second cylinder, a pair of fluid conduits each separately communicable with the pressure port of the second of said pair of valves in dependence on the valve position and leading to the respective chambers of the third cylinder, a first fluid pressurizing means with a conduit leading therefrom to the pressure port of the first of said pair of valves, a second fluid pressurizing means with a conduit leading therefrom to the pressure port of the second of said pair of valves and a third fluid pressurizing means with a conduit leading therefrom to the pressure port of the stylus-operated valve.

5. A system according to claim 4 in which the stylus-operated valve in its normal position shuts off fluid flow under pressure to either chamber of the first cylinder, causing the piston therein to cease any motion relative to the cylinder, the relative movement of the piston in the second cylinder then moving both of said pair of valves in unison to their normal position to shut off flow of fluid under pressure to either chamber of the second cylinder, and simultaneously discontinuing any flow of fluid to either chamber of the third cylinder.

6. A system according to claim 4 in which each of said pair of valves is a spool valve movable axially within a cylinder in relation to the valve ports.

7. A hydraulic control system for controlling the movement of a cutting tool in response to the movement of a stylus-operated valve of the type having a hydraulic pressure port and an exhaust port, said system comprising three cylinder-piston combinations each having a cylinder containing a piston with relative movement between piston and cylinder and providing a pair of chambers in each cylinder, one on each side of the piston, at least one or the other of the piston or cylinder of each piston-cylinder combination being a movable element, a movable member adapted to have the cutting tool mounted thereon, said movable member being supported by a first element, which is the movable element, of a first of the piston-cylinder combinations, the second element of the first piston-cylinder combination being stationary, a second of the piston-cylinder combinations having one of its elements fixed relative to said movable member, a control valve means operated by the other element of said second cylinder-piston combination, said control valve means comprising a housing part and a valve part comprising a pair of valves movable in coordination, with relative movement between the valve part and the housing part and each of said pair of valves having a pressure port and an exhaust port, one of said parts being stationary and the other being attached to said last-mentioned element, the third of the piston-cylinder combinations having its movable element fixed relative to the stylus-operated valve and having its other element stationary, a pair of fluid conduits each separately communicable with the pressure port of the stylus-operated valve in dependence on the valve position and leading to the respective chambers of the first cylinder, a pair of fluid conduits each separately communicable with the pressure port of a first of said pair of valves in dependence on the valve position and leading to the respective chambers of the second cylinder, a pair of fluid conduits each separately communicable with the pressure port of the second of said pair of valves in dependence on the valve position and leading to the respective chambers of the third cylinder, a first fluid pressurizing means with a conduit leading therefrom to the pressure port of the first of said pair of valves, a second fluid pressurizing means with a conduit leading therefrom to the pressure port of the second of said pair of valves and a third fluid pressurizing means with a conduit leading therefrom to the pressure port of the stylus-operated valve, whereby movement of the stylus-operated valve in either direction produces corresponding flow of fluid under pressure into the corresponding chamber of the first cylinder to move the movable member in correspondence with movement of the stylus.

References Cited in the file of this patent

UNITED STATES PATENTS

| | | |
|---|---|---|
| 2,380,357 | Ziebolz | July 10, 1945 |
| 2,391,492 | Turchan et al. | Dec. 25, 1945 |
| 2,493,828 | Parsons | Jan. 10, 1950 |